United States Patent Office 2,941,972
Patented June 21, 1960

2,941,972

SOLUTIONS OF ACRYLONITRILE POLYMER IN CHLORAL HYDRATE SOLVENT AND PROCESS FOR MAKING SAME

Hobson D. De Witt, New Wilmington, Pa., assignor to The Chemstrand Corporation, Decatur, Ala., a corporation of Delaware No Drawing. Filed Dec. 30, 1957, Ser. No. 705,822

18 Claims. (Cl. 260—30.4)

This invention relates to polymeric acrylonitrile compositions. More particularly, it relates to new and improved solutions of acrylonitrile polymers.

In order to produce shaped articles, such as films, filaments, fibers, threads, yarns, and the like, from polymers of acrylonitrile, the polymeric compositions must be dissolved in a suitable solvent, since melt spinning techniques are not satisfactory with acrylonitrile polymers. Many of the known solvents for polymeric acrylonitrile compositions have defects, such as excessively high melting point, excessively high boiling point, poor solvent power and high cost. Among the solvents capable of dissolving acrylonitrile are succinonitrile, malononitrile and cyclic organic carbonates such as the alkylene carbonate containing from 2 to 4 carbon atoms in the alkylene radical. However, the full value of these dinitriles and carbonates as solvents for polymeric acrylonitrile compositions has not been realized. Although these compounds are now relatively inexpensive and readily available, solutions normally obtained by dissolving acrylonitrile polymers therein have the serious disadvantage of being unstable at temperatures of 45° C. or lower. This instability results in precipitation and gelling and when forming shaped articles therefrom it is necessary to employ temperatures above 45° C. in order to manufacture products which have the necessary and desirable characteristics in order to be salable. However, even though these high temperatures prevent some difficulties, particularly when forming fibers from such solutions by a continuous wet spinning process, such as fouling or clogging of the spinnerets and the production of a non-uniform fiber having undesirable characteristics, they are otherwise disadvantageous. For example, fibers formed from acrylonitrile polymer compositions at high temperatures, rather than being white, are somewhat discolored, that is, brown or yellow in appearance. This causes serious problems in dyeing such fibers, particularly when pastel shades are desired. Spinning at high temperatures also causes problems in the mechanical handling of the solution, since it must be maintained at these temperatures at all times prior to and during the spinning process. Maintaining the solutions at high temperatures necessitates the use of more elaborate and expensive equipment, thereby increasing the production costs of articles formed therefrom. There has been a need, therefore, in industries where such solutions are utilized, for a solvent capable of dissolving acrylonitrile polymer compositions to form solutions which are stable at room temperature (about 25° C.) to about 45° C. and from which shaped articles can be formed at these low temperatures.

It is a principal object of this invention to provide new compositions of matter comprising acrylonitrile polymers dissolved in a mixed solvent containing chloral hydrate and a dinitrile selected from the group consisting of succinonitrile and malononitrile or a cyclic alkylene carbonate. It is a further object of this invention to provide new compositions of matter comprising acrylonitrile polymers dissolved in a mixed solvent containing chloral hydrate and a dinitrile selected from the group consisting of succinonitrile and malononitrile or a cyclic alkylene carbonate containing 2 to 4 carbon atoms in the alkylene radical to form solutions which are stable at low temperatures. It is also an object of the invention to provide new fiber-forming compositions of matter comprising acrylonitrile polymers dissolved in chloral hydrate and a dinitrile selected from the group consisting of succinonitrile and malononitrile or a cyclic alkylene carbonate containing from 2 to 4 carbon atoms in the alkylene radical to form solutions which are stable as low as room temperature. Other objects and advantages will be apparent from a consideration of the description of this invention which follows hereafter.

In general, the objects of the invention are accomplished by dissolving a polymeric acrylonitrile composition in a mixed solvent consisting of chloral hydrate and a dinitrile selected from the group consisting of succinonitrile and malononitrile or a cyclic alkylene carbonate containing from 2 to 4 carbon atoms in the alkylene radical.

The cyclic alkylene carbonates employed in the practice of this invention are alkylene carbonates containing from 2 to 4 carbon atoms in the alkylene radical, such as ethylene carbonate, propylene carbonate, trimethylene carbonate, 1,2-butylene carbonate, 1,3-butylene carbonate, 2,3-butylene carbonate and isobutylene carbonate.

In carrying out the practice of this invention, the mixed solvents are prepared by mixing the dinitrile or carbonate with chloral hydrate and warming the mixture slightly until solution is complete, the chloral hydrate being present in the mixed solvent in a range of 10 to 50 percent based on the total weight of the solvent and preferably in a range of 10 to 40 percent.

Polymeric acrylonitrile compositions are completely soluble in the solvents of this invention and solutions prepared by heating the mixture of polymeric material and solvent are stable as low as room temperature (about 25° C.) to give fluid solutions completely free of gel formations. The optimum proportions can best be determined by selecting a specific amount of polymer and dissolving it in the smallest amount of solvent necessary to form a viscous solution capable of being converted to a shaped article. However, as a practical matter, in carrying out the practice of the invention in order to form shaped articles, such as films, filaments, fibers, yarns, threads and the like, the acrylonitrile polymers ordinarily are employed in a range of 1 to 25 percent based on the total weight of the solvent, and preferably in a range of 5 to 15 percent. Solutions of high solids content and good stability can be prepared by mixing the acrylonitrile polymers in the mixed solvent compositions of the invention and subsequently heating the mixture to a temperature in a range of 60° C. to the boiling point of the mixture. If desired, the mixture may be stirred while heating. Although stirring is recommended, it is not necessary to effect solution.

Acrylonitrile polymers which are employed in the practice of the instant invention include homopolymers, copolymers and blends thereof containing at least 80 percent by weight of polymerized or copolymerized acrylonitrile. Such polymeric materials include polyacrylonitrile, copolymers including binary and ternary polymers containing at least 80 percent by weight of acrylonitrile in the polymer molecule, or a blend comprising polymerized acrylonitrile with from 2 to 50 percent of another polymeric material, the blend having an overall polymerized acrylonitrile content of at least 80 percent by weight. While the preferred polymers employed in the instant invention are those containing at least 80 percent acrylonitrile, generally, recognized as the fiber-forming acrylonitrile polymers, it will be understood that the invention is likewise applicable to polymers containing less than 80 percent acrylonitrile. The acrylonitrile polymers containing less than 80 percent acrylonitrile are useful in forming films, lacquers, coating compositions, molding operations, etc., in all of which applications stability of solutions of the polymers around 25° C. to 45° C. is extremely important and convenient.

The polymer may be a copolymer of from 80 to 98 percent acrylonitrile and from 2 to 20 percent of another monomer containing the $>C=C<$ linkage and copolymerizable with acrylonitrile. Suitable mono-olefinic monomers include acrylic, alpha-chloracrylic and methacrylic acids; the acrylates, such as methylmethacrylate, ethylmethacrylate, butylmethacrylate, methoxymethylmethacrylate, beta-chloroethyl methacrylate and the corresponding esters of acrylic and alpha-chloroacrylic acids; vinyl chloride, vinyl fluoride, vinyl bromide, vinylidene chloride, and 1-chloro-1-bromoethylene; methacrylonitrile; acrylamide and methacrylamide; alpha-chloroacrylamide, or monoalkyl substitution products thereof; methyl vinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic ester; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene vinyl naphthalene, vinyl-substituted tertiary heterocyclic amines, such as vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other $>C=C<$ containing polymerizable materials.

The polymer may be a ternary interpolymer, for example, products obtained by the interpolymerization of acrylonitrile and two or more of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 97 percent of acrylonitrile, from 1 to 10 percent of a vinylpyridine or a 1-vinylimidazole, and from 1 to 18 percent of another substance, such as methacrylonitrile or vinylchloride.

The polymer may also be a blend of polyacrylonitrile or of a binary interpolymer of from 80 to 99 percent acrylonitrile and from 1 to 20 percent of at least one other $>C=C<$ containing substance with from 2 to 50 percent of the weight of the blend of a copolymer of from 10 to 70 percent of acrylonitrile and from 30 to 90 percent of at least one other $>C=C<$ containing polymerizable monomer. Preferably, when the polymeric material comprises a blend, it will be a blend of a copolymer of 90 to 98 percent acrylonitrile and from 2 to 10 percent of another mono-olefinic monomer, such as vinyl acetate, which is not receptive to dyestuff, with a sufficient amount of a copolymer of from 10 to 70 percent acrylonitrile and from 30 to 90 percent of a vinyl-substituted tertiary heterocyclic amine, such as vinylpyridine or 1-vinylimidazole to give a dyeable blend having an overall vinyl-substituted tertiary heterocyclic amine content of from 2 to 10 percent, based on the weight of the blend.

The polymers, useful in the practice of the present invention, may be prepared by any conventional polymerization procedures, such as mass polymerization methods, solution polymerization methods, or aqueous emulsion procedures. The articles manufactured from the solutions formed therewith may be produced by well-known conventional methods, for example, the wet-spinning method for producing fibers. If it is desired to produce shaped articles from the acrylonitrile polymer solutions of the present invention which have a modified appearance or modified properties, various agents may be added to the solutions to accomplish these effects prior to the fabrication of the articles without any ill effects thereon. Such added agents might be pigments, dyes, anti-static agents, fire-retarding agents, etc.

The following examples are intended to illustrate the new compositions of the invention more fully, but are not intended to limit the scope of the invention, for it is possible to effect many modifications therein. In the examples, all parts and percents are by weight unless otherwise indicated.

*Example I*

To a 9 gram mixture of a solution containing 60 percent succinonitrile (M.P. 54–55° C.) and 40 percent chloral hydrate (M.P. 57° C.) there was added with stirring 1 gram of a copolymer containing 94 percent acrylonitrile and 6 percent vinyl acetate. A clear viscous solution was obtained by stirring at normal room temperature. However, solution rapidly was formed by heating the mixture at around 60° C. The solution was stable at all temperatures down to 30° C. and fibers were spun therefrom by the wet spinning method at temperatures between 30° C. and 45° C.

*Example II*

A mixture of 6 grams of ethylene carbonate and 3 grams of chloral hydrate was prepared by warming together at around 40° C. To this mixture there was added with stirring 1 gram of polyacrylonitrile. A clear, colorless viscous solution was obtained by warming at around 60° C. for 15 minutes. The solution was stable at all temperatures down to 40° C. and fibers were spun therefrom by the wet spinning method at this temperature.

When the above examples were repeated with other cyclic carbonates, such as propylene carbonate, trimethylene carbonate, 1,2-butylene carbonate, 1,3-butylene carbonate, 2,3-butylene carbonate, isobutylene carbonate, and malononitrile, similar results were obtained.

The compositions of this invention present many advantages. For example, in the formation of films, fibers, filaments, threads, yarns, shaped articles, and the like, the solutions of this invention permit lower spinning temperatures and easier mechanical handling of the polymeric solutions. The mixed solvents of the invention contain materials which are readily available and inexpensive and their use does not necessitate changes in existing methods of operation. The ability of the solutions of the invention to be converted to shaped articles at lower temperatures eliminates the need for much equipment necessary in present installations to maintain such solutions at high temperatures prior to and during the manufacturing operation. Furthermore, in the formation of fibers from such solutions, spinning at low temperatures eliminates to a large degree the objectionable color present in the fibers due to heat and, therefore, permits a greatly enlarged range of color shades in dyeing the fibers, particularly where pastel shades are desired. Numerous other advantages will be apparent to those skilled in the art from reading the instant description.

As many apparently widely different embodiments of this invention may be made without departing from the spirit and scope thereof, it is to be understood that the same is not to be limited to the specific embodiments thereof except as defined in the appended claims.

I claim:

1. A new composition of matter comprising a solution of a polymer containing at least 80 percent of acrylonitrile and up to 20 percent of another polymerizable mono-olefinic monomer copolymerizable therewith in a solvent consisting of 10 to 50 percent, based on the total weight of the solvent, of chloral hydrate and 50 to 90 percent, based on the total weight of the solvent, of a compound selected from the group consisting of (I) a cyclic alkylene carbonate containing from 2 to 4 carbon atoms in the alkylene radical and (II) a dinitrile selected from the group consisting of succinonitrile and malononitrile.

2. A new composition of matter as defined in claim 1 wherein the polymer is polyacrylonitrile.

3. A new composition of matter as defined in claim 1 wherein the polymer is a copolymer containing from 93 to 97 percent of acrylonitrile and from 3 to 7 percent of another polymerizable mono-olefinic monomer copolymerizable therewith.

4. A new composition of matter as defined in claim 1 wherein the polymer is a blend of 80 to 99 percent of (A) a copolymer containing from 90 to 98 percent of acrylonitrile and 2 to 10 percent of vinyl acetate and 1 to 20 percent of (B) a copolymer containing from 10 to 70 percent of acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

5. A new composition of matter as defined in claim 1 wherein the solvent contains succinonitrile.

6. A new composition of matter as defined in claim 1 wherein the solvent contains malononitrile.

7. A new composition of matter as defined in claim 1 wherein the solvent contains ethylene carbonate.

8. A new composition of matter as defined in claim 1 wherein the solvent contains propylene carbonate.

9. A new composition of matter as defined in claim 1 wherein the solvent contains trimethylene carbonate.

10. A new composition of matter comprising a solution of a polymer blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of 2-methyl-5-vinylpyridine, said blend having an overall vinyl-substituted tertiary heterocyclic amine content of from 2 to 10 percent, based on the weight of the blend, and a solvent consisting of 10 to 40 percent, based on the total weight of the solvent, of chloral hydrate and 60 to 90 percent of ethylene carbonate, said blend being employed in a range of 1 to 25 percent, based on the weight of the total solvent.

11. A process for preparing a new composition of matter comprising mixing a polymer containing at least 80 percent of acrylonitrile and up to 20 percent of another polymerizable mono-olefinic monomer copolymerizable therewith in a solvent containing 10 to 50 percent, based on the total weight of the solvent, of chloral hydrate and 50 to 90 percent, based on the total weight of the solvent, of a compound selected from the group consisting of (I) a cyclic alkylene carbonate containing from 2 to 4 carbon atoms in the alkylene radical and (II) a dinitrile selected from the group consisting of succinonitrile and malononitrile and heating the mixture to a temperature in a range of 60° C. to the boiling point of the mixture to form a homogeneous solution, said polymer being employed in a range of 1 to 25 percent based on the total weight of the solvent.

12. The process as defined in claim 11 wherein the polymer is polyacrylonitrile.

13. The process as defined in claim 11 wherein the polymer is a copolymer containing from 93 to 97 percent of acrylonitrile and from 3 to 7 percent of another polymerizable mono-olefinic monomer copolymerizable therewith.

14. The process as defined in claim 11 wherein the polymer is a blend of 80 to 99 percent of (A) a copolymer containing 90 to 98 percent of acrylonitrile and 2 to 10 percent of vinyl acetate and 1 to 20 percent of (B) a copolymer containing 10 to 70 percent of acrylonitrile and 30 to 90 percent of a vinyl-substituted tertiary heterocyclic amine, said blend having an overall vinyl-substituted tertiary heterocyclic amine content of from 2 to 10 percent, based on the weight of the blend.

15. The process as defined in claim 11 wherein the solvent contains succinonitrile.

16. The process as defined in claim 11 wherein the solvent contains ethylene carbonate.

17. The process as defined in claim 11 wherein the solvent contains malononitrile.

18. The process as defined in claim 11 wherein the solvent contains propylene carbonate.

References Cited in the file of this patent

UNITED STATES PATENTS

| | | |
|---|---|---|
| 2,698,842 | Dickey et al. | Jan. 4, 1955 |
| 2,752,320 | De Witt | June 26, 1956 |